United States Patent [19]

Violland et al.

[11] 4,159,978

[45] Jul. 3, 1979

[54] NOVEL POLYACETAL POLYMERS AND THEIR APPLICATION AS SOIL RELEASE AND ANTI-SOIL REDEPOSITION AGENTS FOR TEXTILE SUBSTRATES

[75] Inventors: Robert Violland, Lyons; Alain Lagasse, Villeurbanne, both of France

[73] Assignee: Rhone-Roulenc Industries, Paris, France

[21] Appl. No.: 884,827

[22] Filed: Mar. 9, 1978

Related U.S. Application Data

[62] Division of Ser. No. 703,827, Jul. 9, 1976, Pat. No. 4,107,056.

[30] Foreign Application Priority Data

Jul. 10, 1975 [FR] France ............................. 75 22626

[51] Int. Cl.$^2$ ............................................. C08G 12/04
[52] U.S. Cl. ..................................... 525/441; 8/115.6; 252/8.8; 560/89
[58] Field of Search ............... 252/8.8, 8.6; 260/67 R, 260/751, 475 P; 8/115.6 A

[56] References Cited

U.S. PATENT DOCUMENTS

| | | | |
|---|---|---|---|
| 3,378,527 | 4/1968 | Case et al. ........................ | 260/67 R |
| 3,836,574 | 9/1974 | Achsel et al. .................... | 260/475 P |
| 3,893,929 | 7/1975 | Basadur ............................ | 252/8.6 |
| 3,985,923 | 10/1976 | Basadur ............................ | 252/8.6 |
| 4,026,941 | 5/1977 | Login et al. ...................... | 260/475 P |

*Primary Examiner*—William E. Schulz
*Attorney, Agent, or Firm*—Bacon & Thomas

[57] ABSTRACT

Novel polyacetal polymers are presented. The polymers provide outstanding renewable soil release, anti-soil redeposition and anti-static properties when applied to natural and synthetic textile substrates, especially textile substrates containing polyester fibers.

9 Claims, No Drawings

NOVEL POLYACETAL POLYMERS AND THEIR APPLICATION AS SOIL RELEASE AND ANTI-SOIL REDEPOSITION AGENTS FOR TEXTILE SUBSTRATES

This is a division of application Ser. No. 703,827, filed July 9, 1976 and now U.S. Pat. No. 4,107,056.

BACKGROUND OF THE INVENTION (1) Field of the Invention

This invention relates to new polyacetal polymers. More particularly, this invention relates to a new hydrophilic polyacetal polymers and their application to textile substrates as soil release and anti-soil redeposition agents, and especially to textile substrates containing polyester fibers.

(2) Description of the Prior Art

The genesis of synthetically produced textile fibers has brought about a tremendous effort in the textile industry along numerous avenues. There has been much research effort directed to the improvement of these synthetic fibers per se, and improved blends of synthetically produced fibers with natural fibers, i.e., cellulose fibers or keratinous fibers. Results of this research have been successful, and the direction of research has been directed from the synthetic polymer per se and/or blends of said polymers with other naturally occurring fibers, and, more specifically, to the physical characteristics and/or endurance properties of garments produced from synthetic fabrics and/or fabric produced from blends of synthetic fibers and naturally occurring fibers.

Much research has been directed to the attainment of a garment having improved soil release properties. Many of the synthetically produced fibers that are presently being incorporated in blends with naturally occurring fibers have a propensity to accept and retain oily grime and dirt. Accordingly, when the garment is being worn the soil and/or oily materials accumulate on the garment and settle in the fabric. Once the garment becomes soiled, it is then subjected to a cleaning process for removal of the dirt and/or oily deposits, and only a dry cleaning process will successfully clean the garment.

The cleaning process normally employed, however, is washing in a conventional home washing machine. During a wash cycle, it is virtually impossible to remove the soil and/or oily stains from the garment, and assuming that the undesirable materials are removed from the garment or a fairly clean garment is being washed, soil remaining in the wash water is redeposited onto the garment prior to the end of the wash cycle. Hence, when the garment is removed from the washing machine and subsequently dried, it has not been properly cleaned. Such a condition, heretofore unavoidable, is quite disadvantageous in that the garment after being worn never again assumes a truly clean appearance, but instead tends to gray and/or yellow due to the soil and/or oily materials deposited and remaining thereon.

The problem heretofore associated with fabrics having synthetic fibers incorporated therein or made entirely of synthetic fibers, has been that the synthetic fibers, as well as being hydrophobic, are oleophilic. Therefore, while the oleophilic characteristics of the fiber permit oil and grime to be readily embedded therein, the hydrophobic properties of the fiber prevent water from entering the fiber to remove contaminants therefrom.

One remedy to the soil removal and soil redeposition phenomenon is to deposit a finish onto the fiber to impart a hydrophilic character to the fiber. Attempts have been made to reduce the oleophilic characteristics of these synthetic fibers by coating the fibers with a coating that is oleophobic, i.e., will hinder the attachment of soil and oily materials to the fibers. Many polymer systems have been proposed which are capable of forming a film around the fibers that constitute the textile material, particularly acid emulsion polymers prepared from organic acids having reactive points of unsaturation. These treating polymers are known as soil release agents.

The term "soil release" in accordance with the present invention refers to the ability of the fabric to be washed or otherwise treated to remove soil and/or oily materials that have come into contact with the fabric. The present invention does not wholly prevent the attachment of soil or oily materials to the fabric, but hinders such attachment and renders the heretofore uncleanable fabric now susceptible to a successful cleaning operation.

Concentrated solutions of soil-release polymers have been padded onto fabrics by textile manufacturers to impart a permanent soil-release finish to the fabric. As the amount of soil-release polymer on the fabric is increased, the ability of the fabric to release soil is increased. However, fabrics with this permanent soil-release finish possess many disadvantages. As the amount of soil-release polymer on the fabric is increased the fabric has a tendency to become stiffer and lose the desirable hand characteristic of the fabric. Thus, the upper limit on the amount of soil-release polymer to be used is determined by economics and the resulting adverse effect on the fabric. Fabrics with a heavy application of soil-release polymer do not have the same desirable appearance and hand as the same fabrics without the soil-release coating. Furthermore, practically speaking, there is a set range of soil-release agent that can be applied, dictated by commercial success.

Some soil-release polymers are effective fabric treating agents even at very low levels on the fabric, at which levels the appearance and hand of the fabric are not adversely affected. Thus, an ideal method of treating a synthetic fiber containing fabric would be to reapply a very small amount of soil-release polymer to the fabric each time the fabric is washed.

Certain polycarboxylate polymers, such as those hydrolyzed acrylamide polymers and certain polymers of methacrylic acid with ethyl acrylate, are very effective soil-release agents at low levels on the fabric. However, these polymers cannot be deposited onto fabrics from dilute solution, as the polymers are so soluble in water that they will not deposit onto the fabric from dilute solution.

Other polymers which have been effective as anti-soil redeposition agents are polyesters containing acid groups or substieuent groups which can be water soluble. French Pat. No. 1,499,508 describes such polyesters which result from the polycondensation of phthalic acid with a low molecular weight glycol and a polyoxyalkylene glycol to yield polyesters containing hydrophobic units consisting of chains of phthalic acid/low molecular weight glycol and hydrophilic units from the polyalkylene glycol groups. The linking bond between the hydrophobic and hydrophilic units is provided by the ester group formed from an acid group and an alcohol group. The reaction temperatures disclosed are above 200° C.

There still exists a need in the textile industry for a finishing compound which provides outstanding renewable soil-release and soil anti-redeposition characteristics to the textile substrate, which is water dispersible and obviates all of the aforementioned disadvantages associated with known soil-release and soil-redeposition agents.

SUMMARY OF THE INVENTION

It has now been found to synthesize novel polyacetal resins containing both hydrophobic and hydrophilic groups, which are easily dispersible in water and provide renewable outstanding soil release and anti-soil deposition characteristics to textile substrates. The novel polyacetal resins of this invention comprise reacting:

Reactant Composition I comprising:
(A) 20–60 weight percent of a reaction product (A) of a phthalic acid, phthalic anhydride or a phthalic diester and at least one saturated diol having a molecular weight less than 300, said reaction product having a hydroxyl number of between 150 and 500 and an acid number of less than 2.
(B) 40–80 weight percent of a component (B) comprising
1. A mixture comprising:
    (a) 50 to 100 weight percent of a hydroxylated compound represented by the general formula R—$(OC_xH_{2x})_n$—OH wherein R represents a hydrogen or a a hydrocarbyl radical selected from the group consisting of alkyl, cycloalkyl, aryl, alkaryl, and arylkyl containing 1 to 20 carbon atoms x is 2,3 or 4 and n is an integer such that molecular weight ranges from between 300 and 10,000.
    (b) 0–50 weight percent of a quaternary dialkyl diethanolamine represented by the general formula:

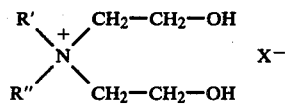

wherein R' and R" represents the same or different alkyl groups containing less than 5 carbon atoms or a benzyl radical and X$^-$ is a halogen or methylsulfate ion, or
2. 100 weight percent of a quaternary ammonium compound containing both oxyalkylene units and quaternized nitrogen atoms are represented by the general formula:

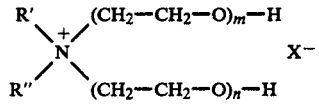

wherein R' and R" represents the same or different members selected from alkyl radicals containing less than 5 carbon atoms or benzyl radicals, and m and n are numbers the sum of which is less than 15 and X$^-$ is a halide or methylsulfate ion.

With Reactant Composition II comprising an aldehyde represented by the general formula:

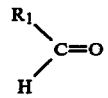

wherein $R_1$ represents a hydrogen atom, an alkyl an aryl or an alkenyl group containing 1 to 10 carbon atoms wherein the number of mols of aldehyde is at least equal to half the total number of hydroxyl groups contained in Reactant Composition I.

DESCRIPTION OF THE PREFERRED EMBODIMENTS

The novel polyacetal polymers of this invention are generally prepared by a multi-stage process. In the first stage reaction product (A) is prepared, followed by the addition of component (B) to prepare Reactant Composition I and in the last stage Reactant Composition I is reacted with Reactant Composition II, an aldehyde, to yield a novel polyacetal polymer.

The first stage involves a condensation reaction of a phthalic acid derivative with at least one saturated diol having a molecular weight less than 300. After the reaction is complete, the system is distilled to drive-off the water by-product and the distilland yields a reaction product (A) having a hydroxyl number in the range of between 150 and 500 and an acid number of less than 2. When the condensation reaction involves diester derivatives of phthalic acid condensed with a diol, a conventional trans-esterification catalyst such as tetraisopropyl orthotitanate is used. The reaction product (A) represents 20 to 60 weight percent and preferably 40 to 60 weight percent of the Reactant Composition I.

In the second stage after cooling the reaction product (A), component B comprising the remaining 40–80 weight percent of the Reactant Composition I is added to the reactor. Component B comprises (1) a mixture comprising (a) 50 to 100 weight percent of a polyoxyalkylene glycol compound, (b) 0 to 50 weight percent of a quaternary dialkyl diethanolamine compound. In another embodiment of this invention the mixture (1) can be replaced with 100 weight percent of a quaternary amine compound (2). In the final stage Reactant Composition II, an aldehyde, is added to Reactant Composition I. The number of mols of aldehyde in Reactant Composition II must be at least equal to half the total of hydroxyl groups contained in the Reactant Composition I.

The polymerization reaction is carried out in conventional manner at a temperature of between 50° and 150° C. and at a pressure equal to or less than atmospheric pressure, and preferably in an inert gas atmosphere, usually nitrogen, and in the presence of an acid catalyst such as p-toluenesulfonic acid or an ion exchange resin carrying acid groups such as, sulfonic acid groups. After the polymerization reaction is complete, the system is neutralized with an organic or inorganic base and a polyacetal is obtained in accordance with this invention.

By way of a non-limiting theory the structural features of the polymer chain may explain the surprising characteristics of the novel polyacetals of this invention. The acetal moiety forms a bridge linking the hydrophilic units and the hydrophobic units of the polymer chain, thus of course providing both hydrophilic and hydrophobic properties to the polymer. However, no explanation can be proffered explaining why the polyacetals of this invention are much more easily dispersible in water than the polyester formed from similar hydrophobic and hydrophilic units, e.g., French Pat. No. 1,499,508. In certain instances the polyacetals of this invention are completely water soluble.

Furthermore, since the reaction takes place at a temperature below 150° C., this makes it possible to introduce chain members containing quaternary ammonium compounds between the phthalic units and the oxyalkylene units. At higher temperatures e.g., above 200° C., the quaternary bonds of the nitrogen are unstable. The quaternary ammonium compound in the polymer chain enhances the soil release and the anti-soil redeposition characteristics of the novel polyacetals of this invention.

Suitable phthalic acid derivatives which can be used according to this invention include orthophthalic, isophthalic and terephthalic acids, or their lower alkyl diesters such as the methyl, ethyl, propyl or butyl diesters and orthophthalic anhydride.

Suitable saturated diols of molecular weight less than 300 include alkanediols or alkenylene glycols such as, ethylene glycol, the propylene glycols, the butylene glycols, diethylene glycol, triethylene glycol and tetraethylene glycol. The hydroxylated compounds useful in the present invention are represented by the general formula $R-(OC_xH_{2x})_n-OH$, in which R is hydrogen or a hydrocarbyl radical selected from the group consisting of alkyl, cycloalkyl, aryl, alkaryl, and aralkyl containing 1 to 20 carbon atoms, x is 2, 3 or 4 and n is a number such that the molecular weight of the compounds is between 300 and 10,000. Preferably, a polyoxyalkylene glycol of molecular weight between 300 and 4,000 is chosen. The particularly preferred polyoxyalkylene glycol is polyethylene glycol.

The quaternary dialkyl ethanolamine compounds useful in this invention are represented by the general formula:

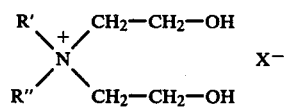

wherein R' and R" represent the same or different members selected from alkyl radicals containing less than 5 carbon atoms or a benzyl radical and $X^-$ is a halide or methylsulfate ion.

A representative example of a quaternary ethanolamine is represented by the formula:

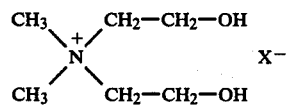

wherein $X^-$ may be $CH_3SO_4$ or Cl.

It is preferred that the component (B) contains at least 2 weight percent of the quaternary ethanolamine compound. The quaternary ammonium compounds containing both oxyalkylene units and quaternized nitrogen atoms are represented by the general formula:

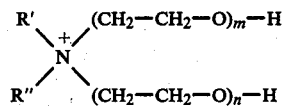

wherein R' and R" represents the same or different members selected from alkyl radicals containing less than 5 carbon atoms or benzyl radicals, m and n are numbers, the sum of which is less than 15, and $X^-$ is a halide or methylsulfate ion. These products are generally obtained by ethoxylation, followed by quaternization, of a primary amine.

Suitable aldehydes which are employed in the process of the present invention are represented by the general formula:

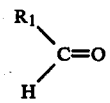

wherein $R_1$ represents a hydrogen atom, an alkyl group, an aryl group, or an alkenyl group containing 1 to 10 carbon atoms. Representative examples of aldehydes are formaldehyde, acetaldehyde, benzaldehyde, chlorobenzaldehyde and citral (dimethyl-3,7-octadiene-2,6-al) and alkyl. Also, suitable are paraformaldehyde and trioxymethylene. Besides, those compounds which form an aldehyde in situ under the conditions of the polymerization reaction such as a dialkylformal like dimethoxymethane or cyclic compounds such as trioxane, dioxolane and their higher homologs can be employed.

The following examples are illustrative of the process and products of the present invention but are not to be construed as limiting the scope thereof.

POLYACETAL FORMATION

EXAMPLE 1

In a first stage, 2,238 parts of dimethyl terephthalate are reacted with 2,232 parts of ethylene glycol in the presence of 0.5 part of tetraisopropyl orthotitanate. The reaction temperature is maintained at 200° C. under atmospheric pressure. The reaction mixture is distilled and the weight of distillate removed under these conditions is 1,510 parts. After distillation the reaction product (A) remaining in the flask has a hydroxyl number of 440 mg of KOH/g and an acid number of less than 0.5 mg of KOH/g. After cooling the contents of the flask to 150° C. 3,050 parts of polyoxyethylene glycol of molecular weight 600, were added to form the Reactant Composition I.

In the final stage, 20 parts of p-toluenesulfonic acid and then 576 parts of paraformaldehyde are added to the Reactant Composition I. Reaction conditions are maintained at atmospheric pressure and 140° C. during the polymerization. After two hours the pressure is gradually lowered to 20 mm Hg and the polymer mixture is distilled for about 4 hours to remove the volatile matter. The polymer mixture is then neutralized with triethanolamine.

The polyacetal obtained in accordance with this example has the following composition:

Reactant Composition I

50% by weight of reaction product (A) of the reaction of dimethyl terephthalate with ethylene glycol, hydroxyl number of 440 and an acid number of less than 0.5, and 50% by weight of polyoxyethylene glycol having a molecular weight of 600,

Reactant Composition II

Paraformaldehyde $$\frac{\text{number of mols of aldehyde}}{\text{number of hydroxyl groups}} = 0.565$$
Reactant Composition I

EXAMPLE 2

In a first stage, 1,940 parts by weight of dimethyl terephthalate are reacted with 2,120 parts of diethylene glycol in the presence of 0.5 part of tetraisopropyl orthotitanate. The reaction is conducted at 200° C. under atmospheric pressure. After completion the reaction mixture is distilled and the weight of distillate removed under these conditions is 650 parts. After distillation, the reaction product (A) remaining in the flask has a hydroxyl number of 325 mg of KOH/g and an acid number of less than 0.5 mg of KOH/g. After cooling the contents of the flask to 100° C., 2,410 parts of polyoxyethylene glycol of molecular weight 600, were added to form the Reactant Composition I.

In the final stage 20 parts of p-toluenesulfonic acid and then 510 parts of paraformaldehyde are added Reactant Composition I. Reaction conditions are maintained at atmospheric pressure and 120° C. during the polymerization. After two hours the pressure is gradually lowered to 20 mm Hg and polymer product distillation is allowed to take place for about 4 hours. The mixture is then neutralized with triethanolamine.

The polyacetal obtained in accordance with this example has the following composition:

Reactant Composition I

50% by weight of the reaction product (A) of the reaction of dimethyl terephthalate with diethylene glycol, having a hydroxyl number of 325 and having an acid number less than 0.5, and 50% by weight of a polyoxyethylene glycol having a molecular weight of 600,

Reactant Composition II

Paraformaldehyde $$\frac{\text{number of mols of aldehyde}}{\text{number of hydroxyl groups}} = 0.545$$
Reactant Composition I

EXAMPLE 3

In a first stage, 1,940 parts by weight of dimethyl terephthalate are reacted with 1,550 parts of ethylene glycol and 530 parts of diethylene glycol in the presence of 0.5 parts of tetraisopropyl orthotitanate. The reaction conditions are maintained at 200° C. under atmospheric pressure. After the reaction is complete the reaction mixture is distilled and the weight of distillate removed under these conditions is 1.510 parts. The reaction product (A) remaining in the flask has a hydroxyl number of 305 mg of KOH/g and an acid number of less than 0.5 mg of KOH/g. After cooling the contents of the flask to 100° C., 2,760 parts of polyoxyethylene glycol of molecular weight 600, were added to form the Reactant Composition I.

In the final stage 20 parts of p-toluenesulfonic acid and 490 parts of paraformaldehyde are added to the Reactant Composition I. The polymerization reaction is conducted at atmospheric pressure and 140° C. After two hours the pressure is gradually lowered to 20 mm Hg and the polymer product is distilled for about 4 hours. The polymer mixture is then neutralized with triethanolamine.

The polyacetal obtained in accordance with this example has the following composition:

Reactant Composition I

50% by weight of the reaction product (A) of the reaction of dimethyl terephthalate with ethylene glycol and diethylene glycol, having a hydroxyl number of 305 and having an acid number of about 0.5, and 50% by weight of polyoxyethylene glycol of molecular weight 600,

Reactant Composition II

Paraformaldehyde $$\frac{\text{number of mols of aldehyde}}{\text{number of hydroxyl groups}} = 0.675$$
Reactant Composition I

EXAMPLE 4

500 parts of polyoxyethylene glycol of molecular weight and 600 and 85 parts of N-methyldiethanolamine are added to 500 parts by weight of the reaction product (A) obtained according to Example 3. The reaction product (A) is heated to 100° C. and 90 parts of dimethyl sulfate are added in order to quaternize the N-methyldiethanolamine. Thirty minutes after the addition is complete, 2 parts of p-toluenesulfonic acid and 120 parts of paraformaldehyde are introduced into the reactor. The reaction is then conducted as described in Example 2.

The polyacetal obtained in accordance with this example has the following composition:

Reactant Composition I 42.5% by weight of the reaction product (A) of the reaction of dimethyl terephthalate with ethylene glycol and diethylene glycol, a hydroxyl number of 305 and an acid number of less than 0.5, and 57.5% by weight of a mixture consisting of 74% by weight of polyoxyethylene glycol having a molecular weight 600 and 26% by weight of N-methyldiethanolamine quaternized with dimethyl sulfate,

Reactant Composition II

Paraformaldehyde $$\frac{\text{number of mols of aldehyde}}{\text{number of hydroxyl groups}} = 0.686$$
Reactant Composition I

EXAMPLE 5

The same operations as according to Example 3 are carried out, except that the polyoxyethylene glycol having a molecular weight of 300 and 740 parts of paraformaldehyde are used.

The polyacetal obtained according to this example has the following composition:

Reactant Composition I

50% by weight of the reaction product (A) of the reaction of dimethyl terephthalate with ethylene glycol and diethylene glycol, having a hydroxyl number of 305 and having an acid number of about 0.5, and 50% by weight of a polyoxyethylene glycol of molecular weight 300,

Reactant Composition II

Paraformaldehyde $$\frac{\text{number of mols of aldehyde}}{\text{number of hydroxyl groups}} = 0.810$$
Reactant Composition I

Textile Treatments

The novel polyacetal polymers of the present invention form a hydrophilic film on the fibers upon drying, and afford soil releasability and anti-soil redeposition at that point. Each subsequent treatment serves to enhance the soil-release characteristics of the fabric substrate. Since the soil-release finish can be applied with each laundering, the soil-release effect is not lost with repeated washings.

The novel polyacetal compositions of the present invention can be used to treat a wide variety of textile materials made exclusively from natural or synthetic materials, as well as, from blends of natural and synthetic fibers. Examples of natural fibers which can be used are wool and cotton. Examples of synthetic fibers which can be successfully treated with the compositions of this invention include those manufactured from polyamide, acrylic and polyester fibers. Blends of natural and synthetic fibers also employed in the practice of this invention include polyester/cotton, polyester/wool, nylon/cotton, inter alia. Cellulose fibers such as viscose, regenerated cellulose, etc. may also be combined with cellulosic fibers. The novel polyacetal compositions of the present invention are most effective on fabrics of pure polyester and blends of polyester/cotton.

Polyester fibers are hydrophobic and thus prevent the ingress of water that is necessary for cleaning the fabric, and also possess an electrical charge that attracts soil particles. The polyacetal polymers of the present invention import a hydrophilic character to the polyester fibers on which they are deposited.

The deposition of the polyacetal polymers according to the invention can be effected by any conventional method. For example, the deposition can be effected by a finishing process carried out on the raw fabric by padding or spraying after dying, or on the textile article after washing by the user. Preferably, the products are deposited during the conventional laundering operation. The polyacetals according to the invention can be incorporated into the detergent compositions or separately introduced into the wash cycle or preferably into the rinse cycle. The subsequent dilution with water thereafter yields a dilute aqueous solution of the same.

The polyacetal polymers will generally be employed in amounts such that the concentration in an aqueous solution will be about $2 \ 10^{-3}$ to 5 weight percent, and preferably about $2 \ 10^{-3}$ to 2 weight percent.

When the polyacetal polymers of this invention are present in dilute aqueous solution into which the polyester or polyester-blend fabrics are immersed, the polyacetal polymers are absorbed onto the polyester fiber forming a hydrophilic film which remains on the fibers after the fabric is removed from the solution and dried. This film makes the polyester fibers more wettable and thus oily soils and stains deposited on the fabric prior to the next laundering are more easily removed in said laundering than if the soil release agent were not present on said polyester fibers. In addition, the novel polyacetals of this invention impart anti-static properties to the textile fiber.

The deposition of the polyacetal polymers according to the invention can be effected by any conventional method. For example, the deposition can be effected by a finishing process carried out on the raw fabric by padding or spraying after dying, or on the textile article after washing by the user. Preferably, the products are deposited during the conventional laundering operations. The polyacetals according to the invention can be introduced either into the detergent compositions or separately into the wash cycle or into the rinse cycle. The subsequent dilution with water thereafter yields a dilute aqueous solution of the same.

The polymers according to this invention can be incorporated into any type of anionic, non-ionic, cationic, ampholytic or zwitter-ionic detergent composition. These compositions generally contain a varying amount of a number of conventional ingredients in addition to the surface-active agents and builders. Examples of these ingredients are agents which assist foaming or conversely control foam, such as, polysiloxanes, inorganic salts such as sodium sulphate, bleaching agents per se or mixed with bleaching precursors, and other anti-redeposition agents such as carboxymethylcellulose, as well as, small amounts of prefumes, dyestuffs, fluorescence agents and enzymes.

The ingredients can be incorporated by any conventional means such as, for example, addition in the form of a solution or emulsion in the course of spraying or granulating pulverulent compositions, or by addition in the form of granules to the said compositions. They can also easily be introduced into liquid detergents for domestic or industrial use, in accordance with known techniques.

In the example which follows, the properties of the polyacetal polymers according to the invention as anti-redeposition agents are demonstrated.

EXAMPLE 6

Identical swatches (12×12 cm) of polyester-cotton (67/33) woven fabric are washed in a Lini-Test (ORIGINAL HANAU) apparatus for 20 minutes at 60° C. in hard water (33° French hardness) containing 0.75 g/l of the following conventional detergent composition:

| | |
|---|---|
| linear alkenylbenzenesulphonate (alkyl containing about 12 carbon atoms) | 8.0% |
| alcohol (containing 16 to 18 carbon atoms and about 50 ethylene oxide units) | 3.0% |
| natural tallow soap | 4.0% |
| sodium tripolyphosphate | 30.0% |
| sodium orthophosphate | 1.5% |
| sodium pyrophosphate | 12.5% |
| sodium perborate | 25.0% |
| sodium sulphate | 10.0% |
| sodium disilicate | 6.0% |

The polyacetal polymer according to this invention is added to the washing vessel in an amount equivalent to 3% by weight based on the detergent composition.

Spangler soiling agent (see J. Am. Oil Chem., 1965-42-723-727) at a concentration of 5% relative to the weight of the detergent solution is introduced into each washing vessel. The swatches were then washed in accordance with the conditions set forth above.

The redeposition of Spangler soiling agent on the fabric is assessed in terms of the value R of the reflectance of the fabric washed in the presence of the polyacetal polymer according to the invention. The reflectance is measured on a Gardner apparatus (GARDNER INSTRUMENTS). By way of comparison, the unsoiled fabric prior to washing has a reflectance equal to 85.6.

The results obtained with a certain number of polymers described above are shown in the Table I below:

Table I

| Product Tested | Blank | A | B | C |
|---|---|---|---|---|
| R | 68.2 | 83.6 | 83 | 82.9 |

The margin of error under the conditions of the test is 1.

In the example which follows, the properties as antisoiling agents of the polyacetal polymer according to the invention, used in an anionic detergent composition are demonstrated.

EXAMPLE 7

Two strips (20×115 cm) of a polyester/cotton (67/33) woven fabric of reflectance C are washed in a Miele 421S automatic machine (programmed for colored fabrics—60° C.) in the presence of 5 g/l of the following conventional detergent composition:

| | |
|---|---|
| linear alkylbenzenesulphonate (alkyl containing about 12 carbon atoms) | 9.9% |
| alcohol containing 16 to 18 carbon atoms and about 15 ethylene oxide units | 5.0% |
| natural tallow soap | 6.6% |
| sodium tripolyphosphate | 34.0% |
| sodium orthophosphate | 0.9% |
| sodium pyrophosphate | 2.3% |
| sodium perborate | 22.9% |
| sodium sulphate | 4.8% |
| sodium disilicate | 5.4% |
| carboxymethylcellulose | 0.6% |
| water | 7.6% |

The polyacetal polymer is introduced at a concentration of 3% by weight relative to the detergent composition. The strips of fabric are then dried at ambient temperature and cut into squares (12×12 cm) on which spent engine oil, Spangler soiling agent, tomato concentrate and lipstick are deposited, using 6 squares per type of stain. The stains are then aged for one hour in an oven at 60° C. The reflectance of the fabric squares R is measured on an Elrepho apparatus with a FMY/C filter for the spent engine oil and the Spangler soiling agent and an FMX/C filter for the tomato concentrate and the lipstick.

The stained squares are then basted onto ten clean cotton clots after which they are washed as above, and dried. The reflectance $R_1$ is measured and the efficiency of the polyacetal polymer tested, as an anti-soiling agent, is assessed from the percentage removal of the stains, calculated by the equation:

$$E \text{ in } \% = \frac{R_1 - R}{C - R} \times 100$$

For each product tested, the mean percentage removal of the various stains is calculated. The results of these tests are shown in the Table II below.

Table II

| Product tested | Blank | A | B | C | D | E |
|---|---|---|---|---|---|---|
| E in % | 39 | 74 | 55 | 74 | 71 | 70 |

The margin of error under the conditions of the tests is 1.

In the example which follows, the properties as antisoiling agents of the polyacetal polymers according to the invention, used in a non-ionic detergent, are demonstrated.

EXAMPLE 8

The tests are carried out under identical conditions to those described in Example 7, except for the following non-ionic detergent composition:

| | |
|---|---|
| alcohol (containing 10 to 12 carbon atoms and an average of 5 ethylene oxide units) | 9.4% |
| sodium tripolyphosphate | 31.4% |
| sodium orthophosphate | 1.1% |
| sodium pyrophosphate | 7.3% |
| sodium perborate | 26.2% |
| sodium sulphate | 15.8% |
| sodium disilicate | 8.5% |
| polysiloxane (anti-foaming agent) | 0.3% |

The results of these tests are shown in the Table III below.

Table III

| Product tested | Blank | A | B | C |
|---|---|---|---|---|
| E in % | 60 | 82 | 83 | 83 |

The margin of error under the condition of the tests is 1.

In the example which follows, the properties as antisoiling agents of the polyacetal polymers according to the invention when introduced in the last rinse of a laundering operation are demonstrated.

EXAMPLE 9

Two strips (20=115 cm) of a polyester/cotton (67/33) woven fabric of reflectance C are washed in a Miele 421 S automatic machine (programmed for colored fabrics) in the presence of 5 g/l of the following conventional detergent composition:

| | |
|---|---|
| linear alkylbenzenesulphonate | 9.9% |
| alcohol (containing 16 to 18 carbon atoms and about 15 ethylene oxide units) | 5.0% |
| natural tallow soap | 6.6% |
| sodium tripolyphosphate | 34.0% |
| sodium orthophosphate | 0.9% |
| sodium pyrophosphate | 2.3% |
| sodium perborate | 22.9% |
| sodium sulphate | 4.8% |
| sodium disilicate | 5.4% |
| carboxymethylcellulose | 0.6% |
| water | 7.6% |

3 g of the product tested are introduced during the last rinse of the laundering operation. The strips of fabric are then dried at ambient temperature and cut into squares (12×12 cm) on which spent engine oil, Spangler soiling agent, tomato concentrate and lipstick are deposited, using six squares per type of stain. The stains are then aged for one hour in an oven at 60° C. Their reflectance R is measured on an Elrepho apparatus with a FMY/C filter for the spent engine oil and the Spangler soiling agent and an FMX/C filter for the tomato concentrate and lipstick.

The stained squares are then basted onto ten clean cotton cloths after which they are washed in the presence of a concentration of 5 g/l of the detergent composition described above. After drying, the reflectance $R_1$ of the squares is measured. The efficiency of the product tested, as an anti-soiling agent, is assessed from the percentage removal of the stains, calculated by the equation:

$$E \text{ in } \% = \frac{R_1 - C}{C - R} \times 100$$

Thereafter the mean percentage removal of the various stains is calculated. The results of these tests are presented in the Table IV below:

Table IV

| Product tested | Blank | A | B |
|---|---|---|---|
| E in % | 39 | 49 | 53 |

The deviation in this test is 1%.

In the example which follows, the properties of the polyacetal polymers according to this invention as antistatic agents are demonstrated.

EXAMPLE 10

Two strips (20×115 cm) of polyester woven fabric (Dacron type 54, TEST FABRICS INC.) are washed in a Miele 421 S automatic machine (programmed for colored fabrics 60° C.) in the presence of 5 g/l of the detergent composition described in Example 7. The polyacetal polymer is introduced at the rate of 3% by weight relative to the detergent composition into which it is incorporated. The strips of fabric are then dried at ambient temperature and cut into discs having a diameter of about 10 cm. The fabric discs are then conditioned for 24 hours in a chamber which is maintained at a control temperature and humidity (22° C., 46% relative humidity). Each of the samples is charged by an electrostatic treatment and the time for half-discharge and three-quarters is then measured by means of an electrostatimeter (Creusot-Loire).

Table V

| Product tested | Blank | A | B |
|---|---|---|---|
| half-discharge in sec | 182 | 3.5 | 8.3 |
| ¾discharge in sec | 1,437 | 13 | 24 |

It can be seen clearly from Table V that the produces according to the invention impart a marked anti-static character on the fabrics on which they are deposited.

What is claimed is:

1. A hydrophilic polyacetal polymer prepared by reacting Reactant composition I comprising:
   (A) 20-60 percent of a reaction product
      (A) of a phthalic acid, phthalic anhydride of a phthalic diester and at least one saturated diol having a molecular weight less than 300, said reaction product having a hydroxyl number of between 150 and 500 and an acid number of less than 2.
   (B) 40-80 percent of a component (B) comprising.
      1. A mixture comprising:
         (a) 50 to 100 weight percent of a hydroxylated compound represented by the general formula R—(OC$_x$H$_{2x}$)$_n$—OH wherein R represents a hydrogen or a hydrocarbyl radical selected from the group consisting of alkyl, cycloalkyl, aryl, alkaryl, and aralkyl containing 1 to 20 carbon atoms, x is 2, 3, or 4 and n is an integer such that molecular weight ranges from between 300 and 10,000
         (b) 0-50 weight percent of a quaternary dialkyl diethanolamine represented by the general formula:

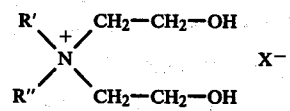

wherein R' and R" represents the same or different alkyl groups containing less than 5 carbon atoms or a benzyl radical − and X− is a halogen or methylsulfate ion, or 2. 100 weight percent of a quaternary ammonium compound containing both oxyalkylene units and quaternized nitrogen atoms represented by the general formula:

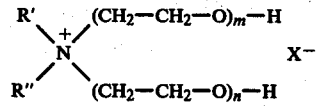

wherein R' and R" represent the same or different members selected from alkyl radicals containing less than 5 carbon atoms or benzyl radicals, and m and n are numbers the sum of which is less than 15 and X− is a halide or methylsulfate ion.

With Reactant Composition II comprising an aldehyde is represented by the general formula:

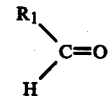

wherein R$_1$ represents a hydrogen atom, an alkyl, an aryl or an alkenyl group containing 1 to 10 carbon atoms; wherein the number of mols of aldehyde is at least equal to half the total number of hydroxyl groups contained in Reactant Composition I.

2. The polyacetal according to claim 1 wherein said saturated diol is selected from the group consisting of ethylene glycol, a propylene glycol, a butylene glycol, diethylene glycol, triethylene glycol or tetraethylene glycol.

3. The polyacetal according to claim 1 wherein component (B) is a polyoxyalkylene glycol having a molecular weight between 300 and 4,000.

4. The polyacetal according to claim 1 wherein component (B) is represented by the following general formula,

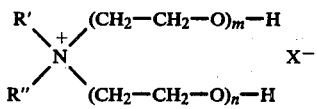

wherein R' and R" represent the same of different members selected from alkyl radicals containing less than 5 carbon atoms or benzyl radicals, and m and n are numbers the sum of which is less than 15, and X⁻ is a halide or methylsulfate ion.

5. The polyacetal according to claim 1 wherein component (B) is a mixture comprising:

(a) 50 to 100 weight percent of a hydroxylated compound represented by the general formula R—(OC$_x$H$_{2x}$)$_n$—OH wherein R represents a hydrogen of a hydrocarbyl radical selected from the group consisting of alkyl, cycloalkyl, aryl, alkaryl and aralkyl containing 1 to 20, carbon atoms, x is 2,3 or 4 and n is an integer such that molecular weight ranges from between 300 and 10,000.

(b) 0-50 weight percent of a quaternary dialkyl diethanolamine represented by the general formula:

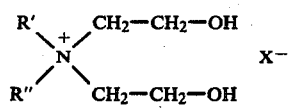

wherein R' and R" represent the same or different alkyl groups containing less than 5 carbon atoms and benzyl, and x⁻ is a halogen or methylsulfate ion.

6. The polyacetal according to claim 1 wherein Reactant Composition II comprises an aldehyde represented by the general formula:

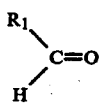

wherein R$_1$ represents a hydrogen atom, an alkyl or an alkenyl group consisting 1 to 10 carbon atoms and wherein the number of mols of aldehyde is at least equal to half the total number of hydroxyl groups contained in Reactant Composition I.

7. The polyacetal according to claim 5 wherein said aldehyde is selected from the group consisting of formaldehyde, benzaldehyde, chlorobenzaldehyde or dimethyl-3,7-octadiene-2,60.

8. The polyacetal according to claim 6 wherein said aldehyde is formed in situ by decomposition of dimethoxymethane, trioxane or dioxolane.

9. A process for the preparation of a polyacetal polymer comprising said Reactant Composition I and Reactant Composition II at a temperature range of between 50° and 150° C. and a pressure equal to or less than atmospheric pressure.

* * * * *